UNITED STATES PATENT OFFICE.

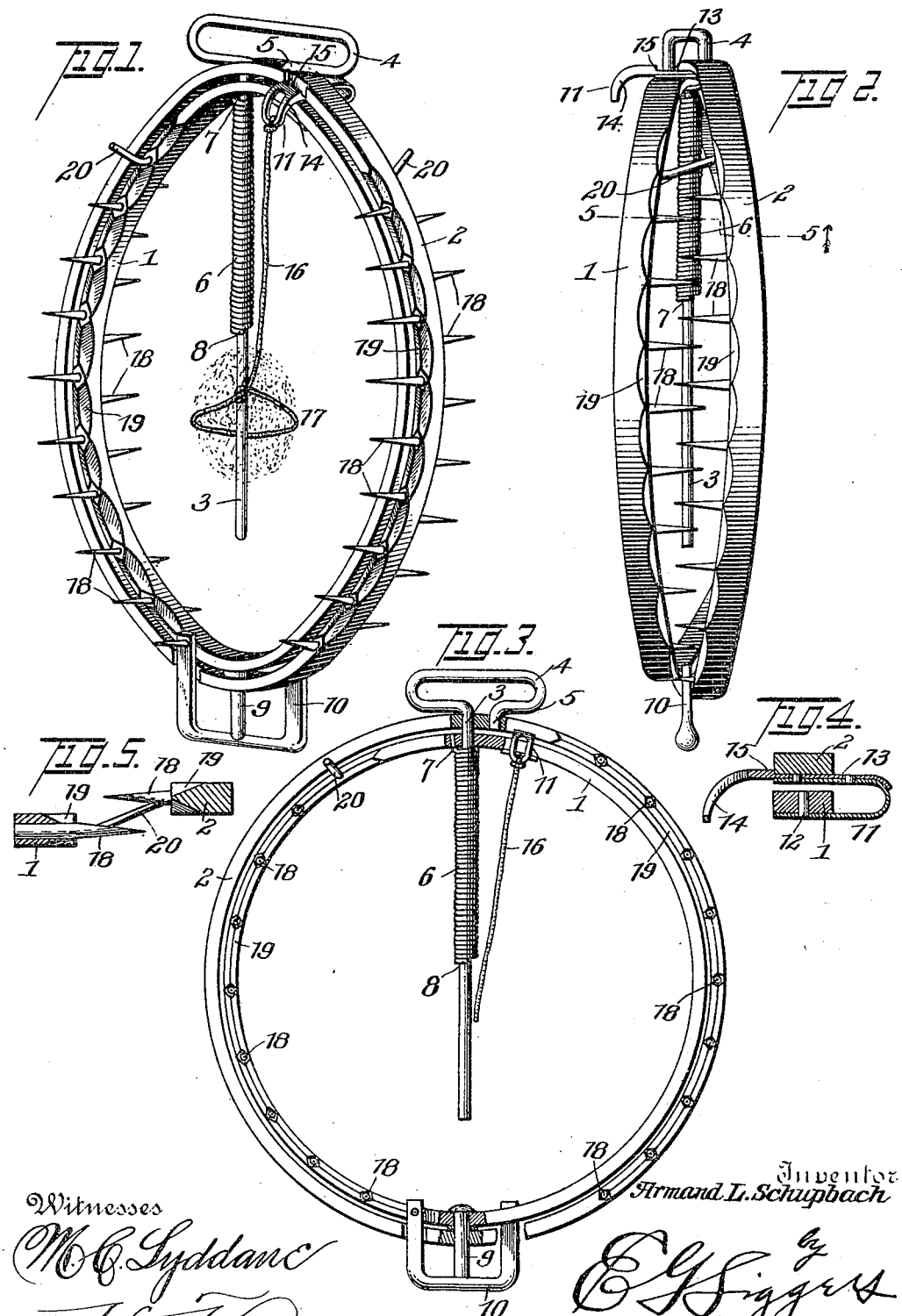

ARMAND LOUIS SCHUPBACH, OF NEW BRITAIN, CONNECTICUT.

FISH-TRAP.

No. 812,300.  Specification of Letters Patent.  Patented Feb. 13, 1906.

Application filed April 15, 1905. Serial No. 255,811.

*To all whom it may concern:*

Be it known that I, ARMAND LOUIS SCHUPBACH, a citizen of the United States, residing at New Britain, in the county of Hartford and State of Connecticut, have invented a new and useful Fish-Trap, of which the following is a specification.

The invention relates to improvements in fish-traps.

The object of the present invention is to improve the construction of traps and to provide a simple and comparatively inexpensive one of great strength and durability designed especially for fishing and adapted particularly for catching eels and catfish and capable of being employed for trapping various animals.

A further object of the invention is to provide an exceedingly sensitive trap adapted to be hung on a line and capable of impaling eels and of effectually preventing the same from escaping and at the same time permitting them to be readily removed from the trap without handling them.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of a trap constructed in accordance with this invention and shown set. Fig. 2 is an elevation of the same, the trap being sprung. Fig. 3 is a sectional view, partly in elevation. Fig. 4 is a detail sectional view illustrating the construction of the catch. Fig. 5 is an enlarged detail sectional view taken substantially on the line 5 5 of Fig. 2.

Like numerals of reference designate corresponding parts in all the figures of the drawings.

1 and 2 designate inner and outer open circular frames or rings pivotally connected at the top and bottom at diametrically opposite points and forming opposite jaws, which are spring-actuated and which are adapted to close upon the fish attracted by the bait. The upper pivot consists of a rod 3, piercing the inner and outer frames at the top, as clearly shown in Fig. 3, and having its outer portion bent to form a handle 4, which consists of a laterally-extending loop adapted to receive a line, the outer terminal 5 of the material being secured in a perforation of the outer frame, whereby the upper pivot and the loop-shaped handle are rigidly connected to the same. The pivot or pintle rod 3 is extended diametrically of the trap from the top to within a short distance of the bottom, and it terminates short of the said bottom to provide a space for enabling a bunch of bait to be readily placed on the pivot or pintle rod, which constitutes a bait-holder and also a support for a coiled spring 6. The coiled spring 6, which may be of any size and strength to suit the size of the trap, is secured at its upper end 7 to the inner frame and its lower end 8 is secured to the pintle-rod. The lower pivot 9 pierces the inner and outer frames at the bottom thereof and is rigidly connected to the inner frame, and it is provided with a loop-shaped handle 10, consisting of a separate approximately U-shaped piece secured to the inner frame at the opposite edges thereof and to the outer end of the pintle or pivot 9. The sides of the handle 10 straddle the inner and outer frames at the bottom and are adapted to be readily grasped with one hand while the other hand grasps the handle 4, which is connected with the outer frame. By this arrangement the jaws of the trap may be readily opened for setting the trap.

The trap is maintained in its set position by means of a substantially U-shaped spring-catch 11, constructed of resilient material and having one side secured to the inner face of the inner frame by means of a suitable fastening device 12, and the other side 13 lies exteriorly of the inner frame and is provided with a curved end 14, arranged to be engaged and depressed by the outer frame when the jaws are opened to set the trap. The catch is provided at the outer engaging side with a shoulder 15 for engaging the outer frame, as clearly indicated in Fig. 4 of the drawings. The extended free end or portion 14 is provided with an opening and is adapted to receive a flexible connection 16, extending to the bait 17. (Indicated in dotted lines in Fig. 1 of the drawings.) The catch (shown in Fig. 4 of the drawings) consists of a U-shaped spring and a separate plate extended to form the curved end 14; but it may consist of a single piece of resilient material, as will be readily understood. The flexible connection may consist of a cord, chain, or the like, and when the bait is pulled by a fish it will trip the catch or setting device by drawing the side 13 downward or inward out of engagement with the outer frame. The coiled spring will then close the jaws, which are provided at intervals with alternately-arranged overlapping spurs or teeth 18. The spurs or teeth 18, which preferably consist of sharp-pointed pins, are arranged at short intervals and are adapted to pierce the fish, which will be impaled on two or more of the spurs or teeth. The pins which form the spurs or teeth have tapered outer portions, and their inner portions or shanks are secured in perforations of the inner and outer frames or rings and extend entirely through the same. The spurs or teeth may, however, be formed on the jaws of the inner and outer rings or frames in any other desired manner. The engaging edges on which the spurs or teeth are mounted are beveled at 19 between the teeth to enable them to cut through the water and close quickly on a fish. The closing movement is limited by means of stops 20, which prevent the spurs or projections of one jaw from coming in contact with the opposite jaw and being dulled, broken, or otherwise injured. The stops consist of short rods or pieces secured to the inner frame near the upper portion thereof and arranged to abut against the outer frame, as clearly shown in Figs. 2 and 5 of the drawings.

The upper loop-shaped handle serves as a convenient means for attaching a fishing-line or cord to the trap, which in practice will be suspended in an upright position. The bait may consist of a bunch of worms tied together and secured to the lower end of the flexible connection 16; but any other form of bait may be employed, as will be readily understood.

Having thus fully described my invention, what I claim as new, and desire to secure by Letters Patent, is—

1. A trap of the class described, comprising a pair of spring-actuated frames forming jaws, a pivot connecting the frames and extending into the same to form a bait-holder, and means for holding the trap set and for tripping the same.

2. A trap of the class described, comprising a pair of frames forming coöperating jaws, a pivot connecting the frames and extending into the same to form a bait-holder, a spring also mounted on the pivot for actuating the jaws, and means for holding the trap set and for tripping the same.

3. A trap of the class described, comprising a pair of open frames, pivots connecting the frames at diametrically opposite points and provided with handles, one of the handles being connected with one of the frames, and the other handle being connected with the other frame, and means for holding the trap set and for tripping the same.

4. A trap of the class described, comprising a pair of open frames, pivots connecting the frames at diametrically opposite points and provided with handles arranged exteriorly of the frames and consisting of loops, one of the loops being rigid with one of the frames and adapted to be connected to a line and the other loop being rigid with the other frame, and means for holding the trap set and for tripping the same.

5. A trap of the class described, comprising a pair of open frames forming coöperating jaws, a pivot piercing the frames and having an exterior laterally-projecting loop forming a handle and adapted to receive a line, and means for holding the trap set and for tripping the same.

6. A trap of the class described, comprising a pair of open frames, a pivot connecting the frames and extending into the same to provide a bait-holder and exteriorly of the same to form a loop-shaped handle, a spring disposed on the inner portion of the pivot for actuating the jaws, and means for holding the trap set and for tripping the same.

7. A trap of the class described, comprising a pair of open spring-actuated frames pivotally connected and provided with spurs projecting from the engaging edges of the frames, and means for preventing the spurs from coming in contact with the frames when the trap is sprung.

8. A trap of the class described, comprising a pair of open spring-actuated frames pivotally connected and provided at their engaging edges with projecting spurs, and a stop extending from one frame and arranged to be engaged by the other to limit the closing movement of the trap.

9. A trap of the class described, comprising a pair of open spring-actuated frames pivotally connected and having beveled engaging edges, spurs or teeth projecting from the engaging edges, and means for limiting the closing movement of the trap to prevent the spurs or teeth of one of the frames from coming in contact with the other frame.

10. A trap of the class described, comprising a pair of open pivotally-connected spring-actuated frames, and a catch arranged when the frames are opened to their set position to automatically lock the same in such position, and means for holding a bait and for connecting the latter with the catch.

11. A trap of the class described, comprising a pair of pivoted spring-actuated frames, and a catch mounted on one of the frames and having an engaging portion located in the path of the other frame and arranged to be directly engaged by the same when the frames are opened to their set position whereby the frames are automatically locked in such position.

12. A trap of the class described, comprising a pair of pivoted spring-actuated frames, a bait-holder located within the frames, a catch mounted on one frame and arranged to automatically engage the other and to be disengaged therefrom by an inward pull, and means for connecting the catch with a bait.

13. A trap of the class described, comprising inner and outer spring-actuated frames pivoted together, a substantially U-shaped catch secured at one side to the inner face of the inner frame and having its other side located exteriorly of the said inner frame and arranged in the path of the outer frame and provided with means for engaging the same, and means for connecting the catch with a bait.

14. A trap of the class described, comprising a pair of open frames, and a pivot connecting the frames and extending into the same to provide a bait-holder and exteriorly of the same to form a loop-shaped handle.

In testimony that I claim the foregoing as my own I have hereto affixed my signature in the presence of two witnesses.

ARMAND LOUIS SCHUPBACH.

Witnesses:
HENRY C. ROWE,
ALBERT MORTON.